United States Patent
Okada

(10) Patent No.: US 10,150,690 B2
(45) Date of Patent: Dec. 11, 2018

(54) APPARATUS FOR MANUFACTURING AN OPTICAL FIBER

(71) Applicant: FUJIKURA LTD., Koto-ku, Tokyo (JP)

(72) Inventor: Kenji Okada, Sakura (JP)

(73) Assignee: FUJIKURA LTD., Koto-ku, Tokyo (JP)

( * ) Notice: Subject to any disclaimer, the term of this patent is extended or adjusted under 35 U.S.C. 154(b) by 45 days.

(21) Appl. No.: 15/398,784

(22) Filed: Jan. 5, 2017

(65) Prior Publication Data

US 2017/0113961 A1 Apr. 27, 2017

Related U.S. Application Data

(62) Division of application No. 14/801,284, filed on Jul. 16, 2015, now Pat. No. 9,567,253.

(30) Foreign Application Priority Data

Dec. 26, 2014 (JP) .................................. 2014-265464

(51) Int. Cl.
*C03B 37/025* (2006.01)
*C03B 37/03* (2006.01)
(Continued)

(52) U.S. Cl.
CPC .... *C03B 37/0253* (2013.01); *B29D 11/00721* (2013.01); *B29D 11/00875* (2013.01);
(Continued)

(58) Field of Classification Search
CPC ... C03B 37/025–37/0279; B65H 57/04; B64H 2406/111
See application file for complete search history.

(56) References Cited

U.S. PATENT DOCUMENTS

2009/0139269 A1 6/2009 Filippov et al.
2009/0139270 A1 6/2009 Filippov et al.
(Continued)

FOREIGN PATENT DOCUMENTS

CN 101541695 A 9/2009
CN 101925548 A 12/2010
(Continued)

OTHER PUBLICATIONS

Crane Co., "Flow of Fluids Through Valves, Fittings, and Pipe", Crane Co., 1991, 2 pages (Year: 1991).*
(Continued)

*Primary Examiner* — Lisa L Herring
(74) *Attorney, Agent, or Firm* — Sughrue Mion, PLLC

(57) ABSTRACT

An apparatus for manufacturing an optical fiber, including a drawing portion, a coating portion, and a curing portion; wherein a direction changer which changes a direction of the bare optical fiber is disposed in any position from the drawing portion to the coating portion, the direction changer includes a guide groove which guides the bare optical fiber, a blowout port of a fluid which floats the bare optical fiber wired along the guide groove is formed along the guide groove in the guide groove, and an average flow rate or a highest flow rate of the fluid in an inlet wire portion of the bare optical fiber to the guide groove, and an outlet wire portion from the guide groove is faster than a lowest flow rate of the fluid in an intermediate portion between the inlet wire portion and the outlet wire portion in the blowout port.

8 Claims, 9 Drawing Sheets

(51) Int. Cl.
*C03C 25/10* (2018.01)
*B29D 11/00* (2006.01)
*C03C 25/106* (2018.01)

(52) U.S. Cl.
CPC .......... *C03B 37/032* (2013.01); *C03C 25/106* (2013.01); *C03C 25/1055* (2013.01); *Y02P 40/57* (2015.11)

(56) References Cited

U.S. PATENT DOCUMENTS

| | | |
|---|---|---|
| 2009/0158779 A1 | 6/2009 | Faler et al. |
| 2009/0217710 A1 | 9/2009 | Costello, III et al. |
| 2010/0281922 A1 | 11/2010 | Costello, III et al. |
| 2011/0274404 A1 | 11/2011 | Okada |
| 2011/0289979 A1 | 12/2011 | Faler et al. |
| 2011/0289980 A1 | 12/2011 | Filippov et al. |
| 2016/0168008 A1 | 6/2016 | Bookbinder et al. |

FOREIGN PATENT DOCUMENTS

| | | |
|---|---|---|
| CN | 101952215 A | 1/2011 |
| CN | 102272063 A | 12/2011 |
| CN | 102906040 A | 1/2013 |
| CN | 102906041 A | 1/2013 |
| EP | 0493679 A2 | 7/1992 |
| JP | 5023434 U | 3/1975 |
| JP | 62003037 A | 1/1987 |
| JP | 4-277167 A | 10/1992 |
| JP | 05024743 A | 2/1993 |
| JP | 09263357 A | 10/1997 |
| JP | 2010510957 A | 4/2010 |
| JP | 5571958 B2 | 8/2014 |
| WO | 2008066661 A2 | 6/2008 |
| WO | 2009/085114 A1 | 7/2009 |
| WO | 2009/108315 A2 | 9/2009 |

OTHER PUBLICATIONS

English Abstract and Machine Translation of JP 62-3037 A, which was previously filed Jan. 5, 2017.

Communication dated Oct. 11, 2017 issued by the State Intellectual Property Office of People's Republic of China in counterpart application No. 201510977610.1.

Japanese Notice of Allowance for JP 2014-265464 dated Mar. 17, 2015.

Notice of Allowance dated Oct. 5, 2016 by the United States Patent and Trademark Office in U.S. Appl. No. 14/801,284.

Communication dated Mar. 29, 2018 from the State Intellectual Property Office of the P.R.C. in counterpart Application No. 201510363978.9.

Communication dated Aug. 13, 2018, from United States Patent and Trademark Office in counterpart application No. 15480493.

* cited by examiner

APPARATUS FOR MANUFACTURING AN OPTICAL FIBER

CROSS REFERENCE TO RELATED APPLICATIONS

This application is a Divisional of U.S. application Ser. No. 14/801,284, filed on Jul. 16, 2015, which claims priority from Japanese Patent Application No. JP 2014-265464, filed on Dec. 26, 2014. The entire disclosures of the prior applications are considered part of the disclosure of the accompanying continuation application, and are hereby incorporated by reference.

BACKGROUND OF THE INVENTION

Field of the Invention

The present invention relates to a method of manufacturing an optical fiber and an apparatus of manufacturing the same.

Description of Related Art

In manufacturing of an optical fiber, a method in which an optical fiber is drawn toward a vertically lower direction from an optical fiber preform along a linear path is generally adopted.

In the manufacturing method, there is a restriction on the height of the entire system as a factor affecting productivity. The reason that the height of the system is a main factor which restricts productivity is because it is necessary to ensure a distance for sufficiently cooling a bare optical fiber which is obtained by drawing the optical fiber preform.

When a new facility including a building is built, the restriction can be relaxed; however, an enormous cost is required for building a new facility, and when it is required that productivity is further improved in the future, it is necessary that a new facility will be built at higher cost.

As a method of relaxing the restriction, a method is included in which a direction changer including a fluid bearing is used.

The fluid bearing is for holding a target to be in a noncontact state using the pressure of a fluid such as air, and in the direction changer including the fluid bearing, it is possible to perform direction change with respect to the bare optical fiber without being in contact with the bare optical fiber (a bare fiber).

By using the direction changer, it is possible to change the direction of the bare optical fiber which is subjected to the fiber drawing from the optical fiber preform along the first path to conform to a second path (for example, refer to Japanese Patent No. 5571958 and Japanese Unexamined Patent Application, First Publication No. S62-003037).

In Japanese Patent No. 5571958, a manufacturing method is disclosed in which an apparatus for direction change including a groove into which an optical fiber is introduced and an opening formed in the groove is used. In this method, gas introduced to the apparatus is blown out from the opening through one inflow port, and the direction of the optical fiber is changed in a state where the optical fiber is floated due to the pressure of the gas.

A direction changer disclosed in Japanese Unexamined Patent Application, First Publication No. S62-003037 includes a guide groove which guides a bare optical fiber, and a blowout port for gas which is formed on a lower surface and both side surfaces of the guide groove (refer to Examples, and FIGS. 3A to 4). In the manufacturing method using the direction changer, the direction of the optical fiber is changed in a state where the optical fiber is floated due to the pressure of the gas blown out from four blowout ports.

However, in the manufacturing method disclosed in Japanese Patent No. 5571958 and Japanese Unexamined Patent Application, First Publication No. S62-003037, positioning accuracy of at least a μm order is required at the time of disposing the apparatus for direction change (for example, refer to claim 8 in Japanese Patent No. 5571958).

The reason that an accurate position adjustment is required for disposing the apparatus is because the bare optical fiber is damaged when the bare optical fiber is in contact with an inner surface of the groove of the apparatus, and the strength of the bare optical fiber decreases.

For this reason, it is necessary that the bare optical fiber is floated by maintaining a narrow gap of approximately a few dozen μm between the bare optical fiber and the inner surface of the groove. In addition, it is necessary to accurately adjust the position of a central axis (a path line) before and after the direction change. However, since the gap is small, it is very difficult to adjust the position.

The present invention has been made in consideration of the above-described circumstances and an object of the present invention is to provide a method of manufacturing an optical fiber and an apparatus of manufacturing an optical fiber capable of relaxing a requirement for accuracy in a disposing position of an apparatus for direction change.

SUMMARY OF THE INVENTION

A first aspect of the present invention is a method of manufacturing an optical fiber including drawing an optical fiber preform and forming a bare optical fiber; disposing a coating layer formed of a resin on the outer circumference of the bare optical fiber; and curing the coating layer and obtaining an optical fiber, in which a direction of the bare optical fiber is changed by a direction changer in any position from drawing the optical fiber to disposing the coating layer, the direction changer includes a guide groove which guides the bare optical fiber, a blowout port for a fluid which floats the bare optical fiber wired along the guide groove is formed along the guide groove in the guide groove, and an average flow rate or the highest flow rate in an inlet wire portion of the bare optical fiber to the guide groove and an outlet wire portion from the guide groove is faster than the lowest flow rate of the fluid in an intermediate portion between the inlet wire portion and the outlet wire portion in a flow rate of the fluid from the blowout port.

In a second aspect of the present invention according to the method of manufacturing an optical fiber of the first aspect described above, it is preferable that the average flow rate or the highest flow rate of the fluid in the inlet wire portion and the outlet wire portion is 1.2 to 5 times the lowest flow rate of the fluid in the intermediate portion.

In a third aspect of the present invention according to the method of manufacturing an optical fiber of the first aspect or the second aspect described above, it is preferable that the flow rate of the fluid from the blowout port is adjusted by defining a pressure loss at the time of blowing out the fluid from the blowout port.

In a fourth aspect of the present invention according to the method of manufacturing an optical fiber of any one of the first aspect to the third aspect described above, it is preferable that a width of the blowout port of the inlet wire portion and the outlet wire portion be narrower than a width of the blowout port of the intermediate portion, and the average flow rate or the highest flow rate of the fluid in the inlet wire portion and the outlet wire portion is faster than the lowest flow rate of the fluid in the intermediate portion.

In a fifth aspect of the present invention according to the method of manufacturing an optical fiber of the first aspect or the second aspect described above, it is preferable that an inner space portion which transports the fluid to the blowout port is ensured in the direction changer, the inner space portion includes a first space portion which is in communication with the blowout port of the inlet wire portion and the outlet wire portion, and a second space portion which is in communication with the blowout port of the intermediate portion, and a supplied amount of the fluid with respect to the first space portion and the second space portion is adjusted, and the average flow rate or the highest flow rate of the fluid in the inlet wire portion and the outlet wire portion is faster than the lowest flow rate of the fluid in the intermediate portion.

In a sixth aspect of the present invention according to the method of manufacturing an optical fiber of the first aspect or the second aspect described above, it is preferable that an inner space portion which transports the fluid to the blowout port is ensured in the direction changer, the inner space portion includes a first space portion which is in communication with the blowout port of the inlet wire portion, a second space portion which is in communication with the blowout port of the intermediate portion, and a third space portion which is in communication with the blowout port of the outlet wire portion, and a supplied amount of the fluid in the first space portion to the third space portion is adjusted, and the average flow rate or the highest flow rate of the fluid in the inlet wire portion and the outlet wire portion is faster than the lowest flow rate of the fluid in the intermediate portion.

In a seventh aspect of the present invention according to the method of manufacturing an optical fiber of any one of the first aspect to the third aspect described above, it is preferable that a pressure loss at the time of blowing out the fluid from the blowout port in the inlet wire portion and the outlet wire portion increases compared to the pressure loss in the intermediate portion by forming a narrow portion in communication with the blowout port of the inlet wire portion and the outlet wire portion in the direction changer, and the average flow rate or the highest flow rate of the fluid in the inlet wire portion and the outlet wire portion is faster than the lowest flow rate of the fluid in the intermediate portion.

An eighth aspect of the present invention is an apparatus of manufacturing an optical fiber including a drawing portion configured to draw an optical fiber perform and form a bare optical fiber; a coating portion configured to dispose a coating layer formed of a resin on an outer circumference of the bare optical fiber; and a curing portion configured to cure the coating layer, in which a direction changer which changes a direction of the bare optical fiber is disposed in any position from the drawing portion to the coating portion, the direction changer includes a guide groove which guides the bare optical fiber, a blowout port of a fluid which floats the bare optical fiber wired along the guide groove is formed along the guide groove in the guide groove, and an average flow rate or the highest flow rate of the fluid in an inlet wire portion of the bare optical fiber to the guide groove, and an outlet wire portion from the guide groove is faster than the lowest flow rate of the fluid in an intermediate portion between the inlet wire portion and the outlet wire portion in the blowout port.

In a ninth aspect of the present invention according to the apparatus of manufacturing an optical fiber of the eighth aspect described above, it is preferable that the width of the blowout port of the inlet wire portion and the outlet wire portion is smaller than the width of the blowout port of the intermediate portion, and the average flow rate or the highest flow rate of the fluid in the inlet wire portion and the outlet wire portion is faster than the lowest flow rate of the fluid in the intermediate portion.

In a tenth aspect of the present invention according to the apparatus of manufacturing an optical fiber of the eighth aspect or the ninth aspect described above, it is preferable that an inner space portion which transports the fluid to the blowout port is ensured in the direction changer, and the inner space portion includes a first space portion which is in communication with the blowout port of the inlet wire portion and the outlet wire portion, and a second space portion which is in communication with the blowout port of the intermediate portion.

In an eleventh aspect of the present invention according to the apparatus of manufacturing an optical fiber of the eighth aspect or the ninth aspect described above, it is preferable that an inner space portion which transports the fluid to the blowout port is ensured in the direction changer, and the inner space portion includes a first space portion which is in communication with the blowout port of the inlet wire portion, a second space portion which is in communication with the blowout port of the intermediate portion, and a third space portion which is in communication with the blowout port of the outlet wire portion.

In a twelfth aspect of the present invention according to the apparatus of manufacturing an optical fiber of the eighth aspect or the ninth aspect described above, it is preferable that a pressure loss at the time of blowing out the fluid from the blowout port in the inlet wire portion and the outlet wire portion increases compared to the pressure loss in the intermediate portion by forming a narrow portion in communication with the blowout port of the inlet wire portion and the outlet wire portion in the direction changer, and thus the average flow rate or the highest flow rate of the fluid in the inlet wire portion and the outlet wire portion is faster than the lowest flow rate of the fluid in the intermediate portion.

According to the aspects of the present invention described above, the flow rate of the fluid increases in the inlet wire portion and the outlet wire portion, and thus a pressure difference between a deep portion and a shallow portion of the guide groove increases, and a force in a direction (an outer portion in a radial direction) in which the bare optical fiber is floated increases. For this reason, a shift in a path line position is corrected.

In addition, a flotation amount of the bare optical fiber increases in the inlet wire portion and the outlet wire portion. Thus, a gap between an inside surface of the guide groove and the bare optical fiber is widened, and an acceptable amount with respect to the shift in the path line position increases.

For this reason, it is possible to relax a requirement for accuracy in a disposing position of the direction changer. For example, it is possible to set disposing position required accuracy to be on a μm order to 0.5 mm order (a few hundred μm order), and it is possible to relax a requirement for accuracy of at least a few hundred times.

Accordingly, a disposing operation of the direction changer becomes easy, and damage which is caused by bringing the bare optical fiber in contact with the inside surface of the guide is prevented, and thus it is possible to manufacture the optical fiber with a sufficient yield.

DETAILED DESCRIPTION OF THE INVENTION

Figure 1:
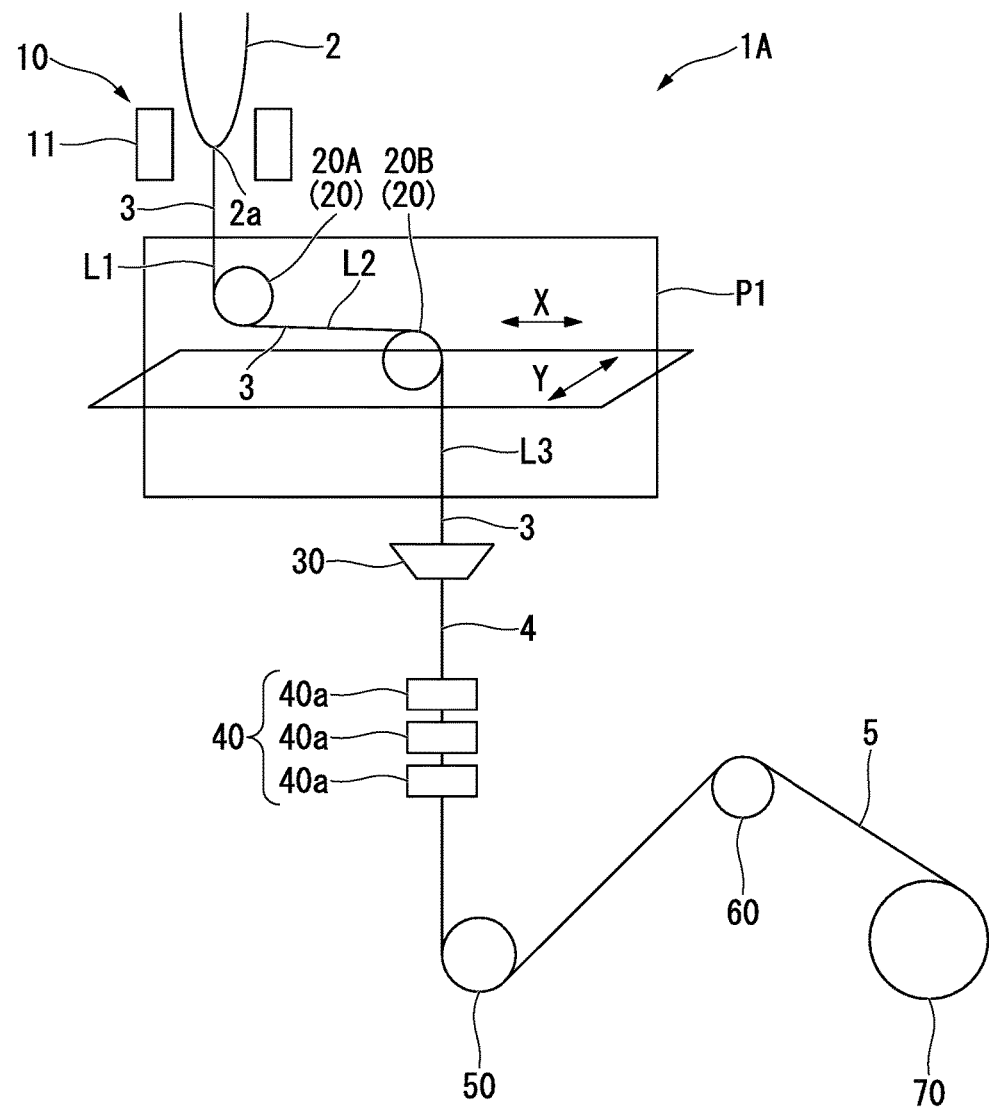
FIG. 1 is a schematic view showing a schematic configuration of a first embodiment of an apparatus of manufacturing an optical fiber.

FIG. 1 is a schematic view showing a schematic configuration of a manufacturing apparatus 1A which is a first embodiment of an apparatus of manufacturing an optical fiber according to the present invention.

The manufacturing apparatus 1A includes at least a drawing unit 10 which draws an optical fiber preform 2 and forms a bare optical fiber 3, direction changers 20 (20A and 20B) which change the direction of the bare optical fiber 3, a coating unit 30 which disposes a coating layer on an outer circumference of the bare optical fiber 3 and forms an optical fiber intermediary body 4, and a curing unit 40 which cures the coating layer of the optical fiber intermediary body 4 to be an optical fiber 5.

A reference numeral "2a" is a tip end portion of a diameter reduced portion (neck-down) of the optical fiber preform 2 which is heated and melted.

The drawing unit 10 includes a heating furnace 11, and forms the bare optical fiber 3 by heating the optical fiber preform 2 using a heating furnace 11 and by drawing the optical fiber preform 2.

A first direction changer 20A among the two direction changers 20 changes the direction of the bare optical fiber 3 which is drawn out to a vertically downward direction from the optical fiber preform 2 to a horizontal direction, and a second direction changer 20B changes the direction of the bare optical fiber 3.

The coating unit 30 applies (coats) a coating material such as a urethane acrylate-based resin onto the outer circumference of the bare optical fiber 3 to be the coating layer, and thus obtains the optical fiber intermediary body 4.

The resin coating, for example, is two-layer coating in which a material for a primary coating layer having a low Young's modulus is applied to the inside, and a material for a secondary coating layer having a high Young's modulus is applied to the outside. The used material, for example, is an ultraviolet curing resin.

The coating unit 30 may have a configuration in which the primary coating layer and the secondary coating layer are separately coated, or may have a configuration in which the primary coating layer and the secondary coating layer are simultaneously coated.

The curing unit 40 includes one or a plurality of UV lamps 40a, and forms the optical fiber 5 by curing the coating layer of the optical fiber intermediary body 4. The curing unit 40, for example, includes a plurality of pairs of UV lamps 40a which are disposed by interposing a space therebetween through which the optical fiber intermediary body 4 passes.

The optical fiber 5 changes the direction thereof by a pulley 50 and is taken up by a take-up unit 60 and is wound by winding means 70.

The take-up unit 60, for example, is a take-up capstan, and determines a fiber drawing speed. The fiber drawing speed, for example, is greater than or equal to 1500 m/min.

The winding means 70 is a winding bobbin which winds the optical fiber 5.

An outer diameter of the optical fiber preform 2, for example, is greater than or equal to 100 mm, and the length of the optical fiber 5 prepared from one optical fiber perform 2, and for example, is a few thousand km.

For example, the optical fiber cannot be moved in a radial direction, and thus the neck-down tip end portion 2a, the coating unit 30, the take-up unit 60, the pulley 50, and the winding means 70 are able to act as a fixed end when the optical fiber is horizontally oscillated. When the coating unit 30 has a configuration in which the primary coating layer and the secondary coating layer are separately coated, either of them is able to act as a fixed end.

Figure 14:
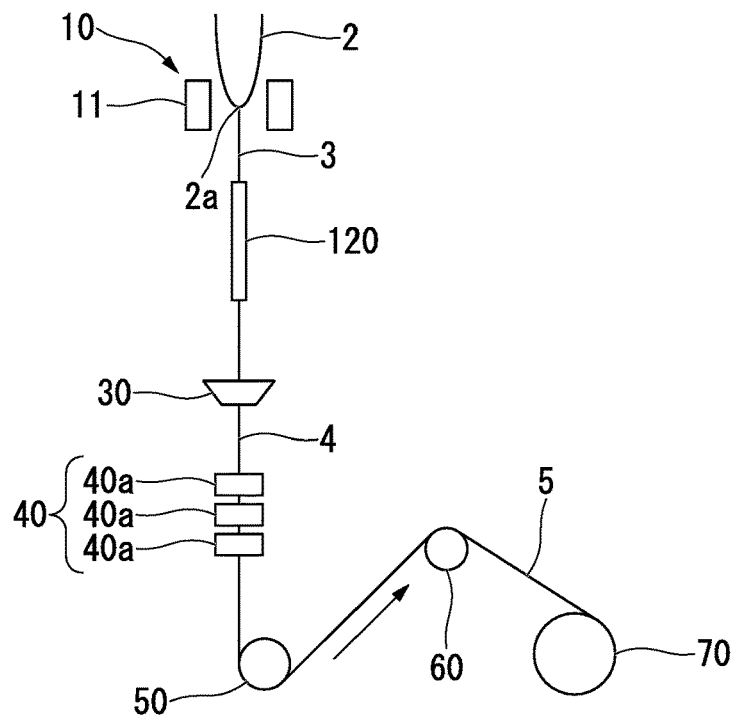
FIG. 14 is a schematic view showing a schematic configuration of an example of an apparatus of manufacturing an optical fiber of the related art.
Figure 15:
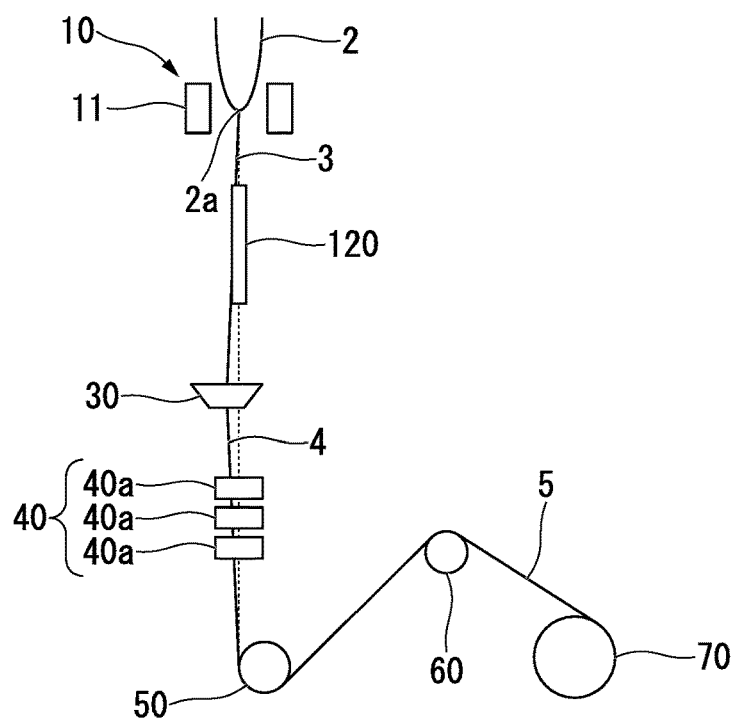
FIG. 15 is a schematic view showing a disposing example of the apparatus of manufacturing an optical fiber shown in FIG. 14.

For example, in a manufacturing apparatus shown in FIG. 14, when the coating unit 30 is disposed by being shifted from a central axis (a path line) of the optical fiber as shown in FIG. 15 in a path from the neck-down tip end portion 2a of the optical fiber preform 2 to the pulley 50, coaxiality of the coating is degraded, and thus an uneven thickness occurs. For this reason, it is necessary that a disposing position of the coating unit 30 conforms to the center of the path line.

Furthermore, a reference numeral "120" refers to a cooling unit which cools the bare optical fiber 3.

In the manufacturing apparatus 1A shown in FIG. 1, it is necessary that the direction changer 20 is disposed in an accurate position with respect to the path line of the bare optical fiber 3 between the neck-down tip end portion 2a and the coating unit 30. However, the direction of the bare optical fiber 3 is changed by the direction changer 20, and thus it is difficult to adjust the position of the direction changer 20 unlike the coating unit 30 of the manufacturing apparatus shown in FIG. 14.

Hereinafter, a disposition of the direction changer 20 will be described in detail.

First, the direction will be defined. As shown in FIG. 1, a surface including a linear path line (a first path L1) of the bare optical fiber 3 before being subjected to direction change by the direction changer 20A and a linear path line (a second path L2) of the bare optical fiber 3 after being subjected to the direction change of 90° by the direction changer 20A is referred to as "P1". An X direction is a direction along the second path L2 in the surface P1, and a Y direction is a direction perpendicular to the surface P1.

The optical fiber preform 2 is in a state of being suspended in the vertically downward direction, and the direction of the bare optical fiber 3 which is drawn out from the optical fiber preform 2 is toward a vertically lower portion. For this reason, in the disposition of the first direction changer 20A, accuracy in a disposing position of the direction (the Y direction) perpendicular to the surface P1 including the first path L1 along a vertical direction and the second path L2 along a horizontal direction is important.

Figure 2:
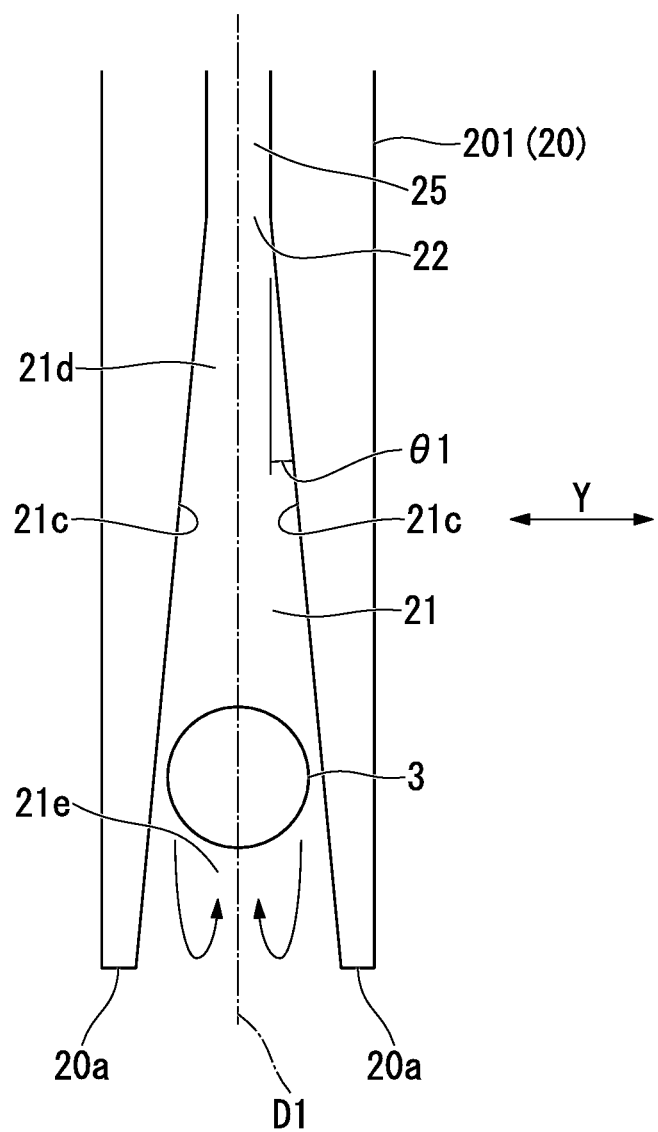
FIG. 2 is a schematic view showing a sectional structure of a direction changer of the manufacturing apparatus shown in FIG. 1.

The reason that accuracy in the positioning of the Y direction is important is because when the bare optical fiber 3 is in contact with an inside surface 21c of the guide groove 21 of the direction changer 20, the strength of the bare optical fiber 3 decreases as shown in FIG. 2, and thus it is necessary to reliably separate the bare optical fiber 3 from the inside surface 21c.

In the manufacturing apparatus 1A, the direction of the bare optical fiber 3 is changed to a third path L3 along the vertical direction by the second direction changer 20B, and thus in the disposition of the second direction changer 20B, accuracy in the disposing position of the direction (the Y direction) perpendicular to the surface P1 including the second path L2 and the third path L3 is required.

The resin coating is generally performed with respect to the vertically downward bare optical fiber, and thus disposition accuracy in the Y direction which is the direction perpendicular to a surface including the path L3 introduced to the coating unit 30 and the path L2 before the direction change is important.

Furthermore, the direction of the bare optical fiber to be subjected to the resin coating is not limited to the vertically downward direction. The direction may be a direction along the second path insofar as the coating can be performed.

In the manufacturing apparatus 1A, in order to relax a requirement for disposition accuracy in the Y direction of the direction changer 20, the direction changer 20 is set such that a blowing out flow rate of a fluid in an inlet wire portion (a portion including a part in which the bare optical fiber 3 moves into the guide groove) and an outlet wire portion (a portion including a part in which the bare optical fiber 3 moves out from guide groove) of the bare optical fiber 3 is faster than the lowest value of the blowing out flow rate of the fluid in the other portion.

Hereinafter, a specific structure of the direction changer 20 will be described.

Figure 3A:
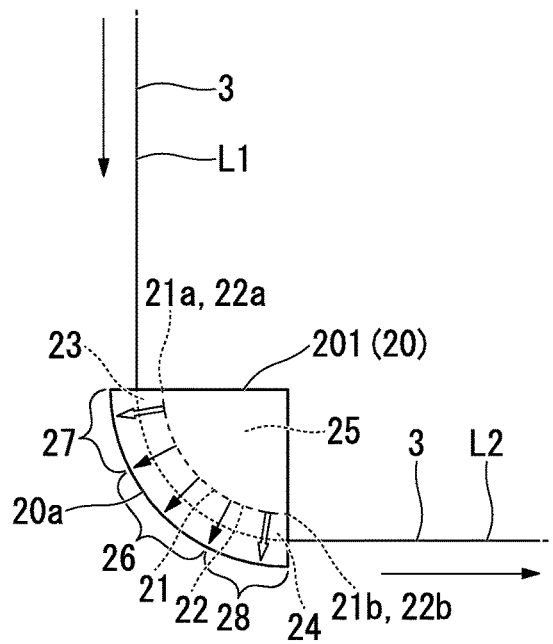
FIG. 3A is a front view showing a first example of the direction changer.

A direction changer 201 shown in FIG. 3A, is a first example of the direction changer 20 and is able to change the direction of the bare optical fiber 3 by 90°.

The direction changer 201 is in the shape of one quarter circle in a plan view, and the guide groove 21 is formed over the entire circumferential length in an outer circumferential surface 20a. The direction changer 201 allows a central axis direction to be coincident with the Y direction, and disposes a radial direction D1 (refer to FIG. 2) in a posture directed towards the direction along the surface P1 (refer to FIG. 1). Here, a direction along the outer circumferential surface 20a which is in the shape of an arc in a plan view is referred to as a circumferential direction.

A blowout port 22 for the fluid (air or the like) which floats the bare optical fiber 3 wired along the guide groove 21 is formed in a lower portion of the guide groove 21 along the guide groove 21. The blowout port 22 is formed over the entire length of the guide groove 21.

As shown in FIG. 2, the direction changer 201 is configured to discharge the fluid (for example, air) in a space (a fluid storing portion 25) ensured in the direction changer 201 into the guide groove 21 through the blowout port 22.

The direction changer 201, for example, can be configured to introduce the fluid to the fluid storing portion 25 from the outside, and to discharge the fluid into the guide groove 21 through the blowout port 22.

It is preferable that the guide groove 21 is formed to be inclined with respect to the radial direction D1 such that a distance between the inside surfaces 21c and 21c (a dimension in the Y direction) gradually increases towards an outer portion in the radial direction. It is preferable that the two inside surfaces 21c and 21c have the same inclination angle θ1 with respect to the radial direction D1.

In the direction changers 20A to 20C, the fluid (for example, air) in the fluid storing portion 25 is discharged into the guide groove 21 through the blowout port 22, and thus it is possible to float the bare optical fiber 3. Specifically, a pressure difference between a deep portion 21d and a shallow portion 21e of the guide groove 21 increases due to the discharged air, and thus the bare optical fiber 3 is floated by applying a force of the outer portion in the radial direction to the bare optical fiber 3.

In the direction changer 201 shown in FIG. 3A, the bare optical fiber 3 moves into a first end 21a of the guide groove 21 in the shape of one quarter circle and moves out from a second end 21b, and thus is subjected to the direction change of 90°. An inlet wire portion 23 into which the bare optical fiber 3 moves is a portion including the first end 21a of the guide groove 21, and an outlet wire portion 24 from which the bare optical fiber 3 moves out of is a portion including the second end 21b of the guide groove 21.

Figure 3B:
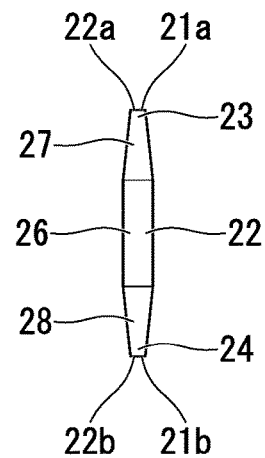
FIG. 3B is a development view showing a blowout port of the direction changer shown in FIG. 3A.

FIG. 3B is a diagram in which the blowout port 22 is developed. As shown in this drawing, the blowout port 22 includes an intermediate portion 26 having a constant width (a constant dimension in the Y direction) over a predetermined length range of the guide groove 21, a first end portion 27 including the first end 22a of the blowout port 22, and a second end portion 28 including the second end 22b of the blowout port 22.

The first end portion 27 extends along the guide groove 21 while the width of the first end portion 27 is narrowed towards the first end 21a of the guide groove 21 from one end of the intermediate portion 26. The second end portion 28 extends along the guide groove 21 while the width of the second end portion 28 is narrowed towards the second end 21b of the guide groove 21 from the other end of the intermediate portion 26.

The first end 22a of the blowout port 22 reaches the first end 21a of the guide groove 21, and the second end 22b reaches the second end 21b.

The first end portion 27 and the second end portion 28, for example, are portions in a circumferential direction range corresponding to 10° to 30°.

In the direction changer 201 shown in FIG. 3A, the first end portion 27 may be in a range in which a position of 0° is a starting end and a position of 10° to 30° is a terminating end in a range of 90°. In addition, the second end portion 28 may be in a range in which a position of 60° to 80° is the starting end and a position of 90° is the terminating end in the range of 90°. In this example, each of the first end portion 27 and the second end portion 28 is in a circumferential direction range corresponding to 11.1% to 33.3% of the entire blowout port 22.

Figure 5A:
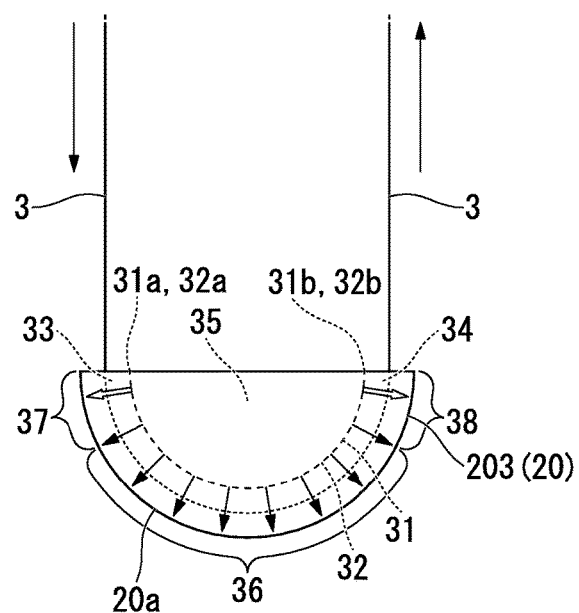
FIG. 5A is a front view showing a second example of the direction changer.

In a direction changer 203 shown in FIG. 5A, a first end portion 37 may be in a range in which a position of 0° is the starting end and a position of 20° to 30° is the terminating end in a range of 180°. In addition, a second end portion 38 may be in a range in which a position of 150° to 160° is the starting end and a position of 180° is the terminating end in the range of 180°. In this example, each of the first end portion 37 and the second end portion 38 is in a circumferential direction range corresponding to 11.1% to 16.7% of the entire blowout port 22.

It is difficult for the first end portion 27 and the second end portion 28 to have a high flow rate in a range close to the first end 21a and the second end 21b, and thus a portion including the first end 21a and the second end 21b may be excluded.

Figure 7:
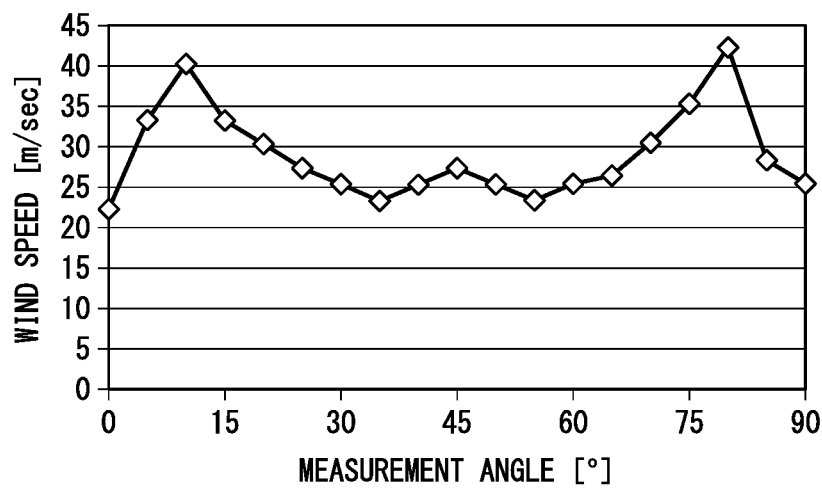
FIG. 7 is a diagram showing a ventilation volume (a wind speed) distribution in a circumferential direction of the direction changer of the first example.

In an example shown in FIG. 7, the first end portion 27 may be a portion excluding a circumferential direction range (in FIG. 7, for example, a range of greater than or equal to 0° and less than 5°) including the first end 21a. In addition, the second end portion 28 may be a portion excluding a circumferential direction range (in FIG. 7, for example, a range of greater than 85° and less than or equal to 90°) including the second end 21b.

That is, the first end portion 27 may be in a range in which a position of 5° is the starting end and a position of 10° to 30° is the terminating end in a range of 90°. In addition, the second end portion 28 may be in a range in which a position of 60° to 80° is the starting end and a position of 85° is the terminating end in the range of 90°.

In this example, each of the first end portion 27 and the second end portion 28 is in a circumferential direction range corresponding to 5.5% to 27.8% of the entire blowout port 22.

Figure 8:
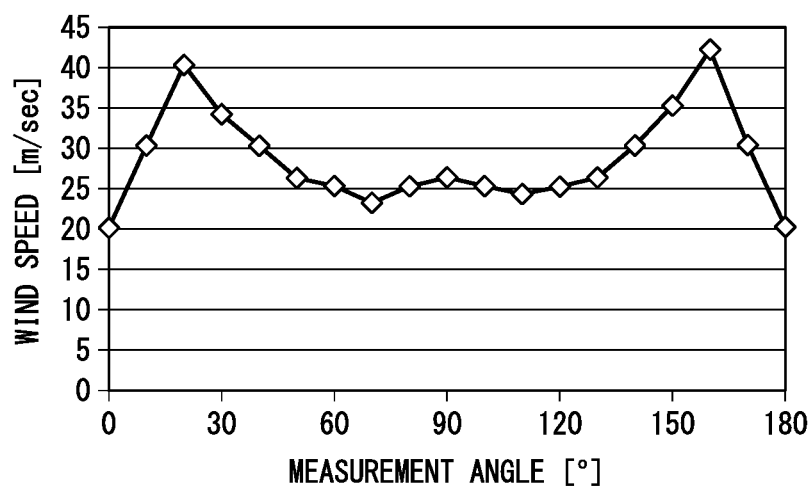
FIG. 8 is a diagram showing a ventilation volume (a wind speed) distribution in a circumferential direction of the direction changer of the second example.

In an example shown in FIG. 8, the first end portion 37 may be a portion excluding a circumferential direction range (in FIG. 8, for example, less than 10°) including a first end 31a. In addition, the second end portion 38 may be a portion excluding a circumferential direction range (in FIG. 8, for example, a range of greater than 170° and less than or equal to 180°) including a second end 31b.

That is, the first end portion 37 may be in a range in which a position of 10° is the starting end and a position of 20° to 30° is the terminating end in a range of 180°. In addition, the second end portion 38 may be in a range in which a position of 150° to 160° is the starting end and a position of 170° is the terminating end in the range of 180°.

In this example, each of the first end portion 37 and the second end portion 38 is in a circumferential direction range corresponding to 5.5% to 11.1% of the entire blowout port 22.

It is not possible to comprehensively determine a difference between the minimum width of the first end portion 27 and the second end portion 28 and the width of the intermediate portion 26 since the difference depends on other designs, but the difference is at least on the order of a few μm to a few dozen μm.

A difference between the minimum width of the first end portion 27 and the second end portion 28, and the width of the intermediate portion 26, for example, is able to be 2 μm to 10 μm. By setting the difference to be in the range described above, it is possible to ensure the blowing out flow rate of the fluid in the first end portion 27 and the second end portion 28, and it is possible to increase a ratio of the blowing out flow rate in the first end portion 27 and the second end portion 28 to the blowing out flow rate in the intermediate portion 26.

It is preferable that the maximum width of the first end portion 27 and the second end portion 28 and the width of the intermediate portion 26 are equal to each other.

The minimum width of the first end portion 27 and the second end portion 28 can be 70% to 98% with respect to the width of the intermediate portion 26. The minimum width of the first end portion 27 and the second end portion 28 is preferably 80% to 95%, and is more preferably 85% to 90%, with respect to the width of the intermediate portion 26.

By setting the ratio of the minimum width of the first end portion 27 and the second end portion 28 to the width of the intermediate portion 26 to be in the range described above, it is possible to ensure the blowing out flow rate of the fluid in the first end portion 27 and the second end portion 28, and it is possible to increase a ratio of the blowing out flow rate in the first end portion 27 and the second end portion 28 to the blowing out flow rate in the intermediate portion 26.

Furthermore, in the first end portion 27, the second end portion 28, and the intermediate portion 26 shown in FIG. 3B, both side edges are linear, and when the width of the first end portion 27, the second end portion 28, and the intermediate portion 26 is narrowed towards the first end 21a and the second end 21b, both of the side edges may be curved.

The width of the first end portion 27 and the second end portion 28 (for example, an average width or the minimum width) is narrowed, and thus the width of the blowout port 22 is narrowed in the inlet wire portion 23 and the outlet wire portion 24 which are both end portions of the guide groove 21.

For this reason, in the inlet wire portion 23 and the outlet wire portion 24, a pressure loss at the time of blowing out the fluid from the blowout port 22 increases compared to the other portion (in this example, a portion between the inlet wire portion 23 and the outlet wire portion 24, that is, a portion in a length range corresponding to the intermediate portion 26), and thus the blowing out flow rate in the inlet wire portion 23 and the outlet wire portion 24 is faster than the lowest flow rate of the fluid in the other portion.

The blowing out flow rate of the fluid in the inlet wire portion 23 and the outlet wire portion 24 may be faster than an average flow rate (or the highest flow rate) of the fluid in the intermediate portion 26.

In comparison to the flow rate of the fluid in the intermediate portion 26, the flow rate of the fluid in the inlet wire portion 23 and the outlet wire portion 24 is the average value or the highest value.

The flow rate of the fluid in the inlet wire portion 23 and the outlet wire portion 24 increases, and a pressure difference between the deep portion 21d (refer to FIG. 2) and the shallow portion 21e of the guide groove 21 increases. Therefore, a force in the direction (the outer portion in the radial direction) which floats the bare optical fiber 3 is increased due to Bernoulli's effect. In addition, an effect of biasing the bare optical fiber 3 to the center of the guide groove 21 (the center of the Y direction) is increased due to Navier-Stokes's theorem in consideration of viscosity. For this reason, a shift in the path line position is corrected.

In addition, a flotation amount of the bare optical fiber 3 increases in the inlet wire portion 23 and the outlet wire portion 24, and thus a gap between the inside surface 21c of the guide groove 21 and the bare optical fiber 3 is widened, and an acceptable amount with respect to the shift in the path line position increases.

For this reason, it is possible to relax a requirement for disposing position accuracy in the direction changer 20.

For example, it is possible to set disposing position required accuracy to be on a μm order to 0.5 mm order (a few hundred μm order), and it is possible to relax a requirement for accuracy of at least a few hundred times. Accordingly, a disposing operation of the direction changer 20 becomes easy, and damage which is caused by bringing the bare optical fiber 3 in contact with the inside surface 21c of the guide groove 21 is prevented, and thus it is possible to manufacture the optical fiber 5 with a sufficient yield.

Further, it is possible to adjust the blowing out flow rate of the fluid in the inlet wire portion 23, the outlet wire portion 24, and the intermediate portion 26. Thus it is possible to ensure the blowing out flow rate of the fluid for floating the bare optical fiber 3 in the intermediate portion 26. In addition, it is possible to set a sufficient blowing out flow rate of the fluid for adjusting the path line position in the inlet wire portion 23 and the outlet wire portion 24 and for adjusting the flotation amount of the bare optical fiber 3. Accordingly, it is possible to reduce the operating cost without wasting the fluid.

In the adjustment of the disposing position in the X direction of the direction changers 20A and 20B, the same accuracy as that in the Y direction is not necessary. This is because the blowing out flow rate of the fluid is adjusted in the X direction, and thus it is possible to perform fine adjustment with respect to a flotation position of the bare optical fiber.

Accordingly, disposition accuracy in the X direction may decrease compared to that in the Y direction within a range where at least a stable flotation amount of the bare optical fiber can be ensured. That is, it is sufficient to avoid a state where the bare optical fiber is not floated due to an insufficient blowing out flow rate of the fluid.

Figure 4:
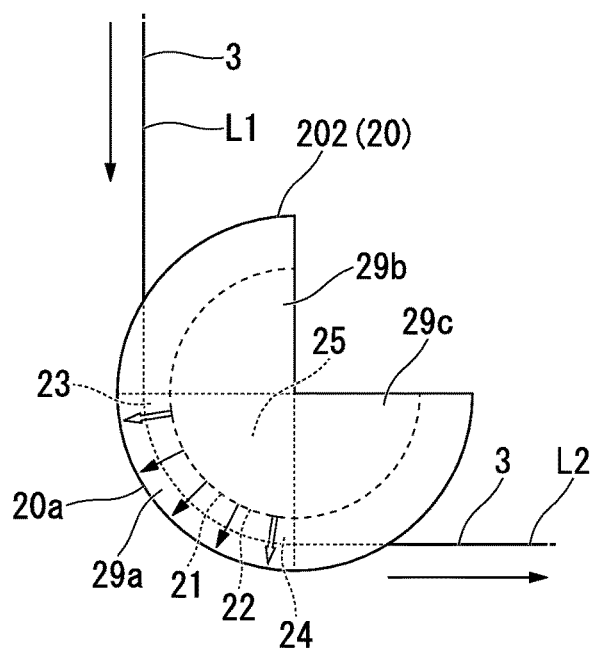
FIG. 4 is a front view showing a modification example of the direction changer of the first example shown in FIGS. 3A and 3B.

A direction changer 202 shown in FIG. 4 is a modification example of the direction changer 201, and is in the shape of a three-quarter circle in a plan view. Hereinafter, the same reference numerals are applied to configurations identical to the configurations described above, and the description thereof will be omitted.

The direction changer 202 has a structure in which on an incoming line side and an outgoing line side of a main body portion 29a having the same structure as that of the direction changer 201 shown in FIG. 3A, auxiliary portions 29b and 29c respectively having the same structure as that of the main body portion 29a are continuously disposed.

The direction changer 202 has a basic function identical to that of the direction changer 201 since the bare optical fiber 3 moves into the guide groove 21 of the main body portion 29a from the inlet wire portion 23, and moves out through the outlet wire portion 24 after the direction thereof is changed by 90° in the main body portion 29a.

The direction changers 201 and 202 are able to change the direction of the bare optical fiber 3 by 90°, and thus are able to be used as the direction changers 20A and 20B shown in FIG. 1.

The direction changer 203 shown in FIG. 5A is a second example of the direction changer 20, and is able to change the direction of the bare optical fiber 3 by 180°. The direction changer 203 is in the shape of a semicircle in a plan view, and a guide groove 31 is formed over the entire circumferential length in the outer circumferential surface 20a.

A blowout port 32 of the fluid (air or the like) which floats the bare optical fiber 3 is formed in a lower portion of the guide groove 31 along the guide groove 31. The blowout port 32 is formed over the entire length of the guide groove 31.

The direction changer 203 is configured to discharge the fluid in the guide groove 31 from the fluid storing portion 35 through the blowout port 32.

In the direction changer 203, the bare optical fiber 3 moves into a first end 31a of the guide groove 31 which is in the shape of a semicircle, and is subjected to direction change of 180° by moving out from a second end 31b. An inlet wire portion 33 is a portion including the first end 31a of the guide groove 31, and an outlet wire portion 34 is a portion including the second end 31b of the guide groove 31.

The sectional shape of the guide groove 31 is the same as the sectional shape of the guide groove 21 (refer to FIG. 2).

Figure 5B:
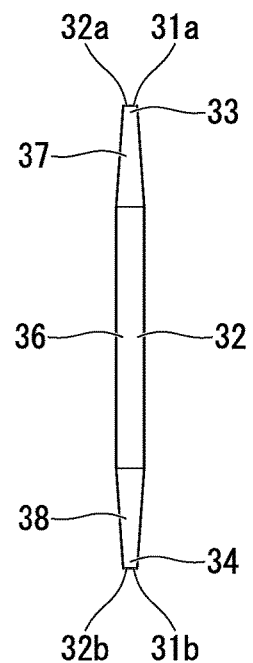
FIG. 5B is a development view showing a blowout port of the direction changer shown in FIG. 5A.

As shown in FIG. 5B, the blowout port 32 includes an intermediate portion 36 having a constant width (a constant dimension in the Y direction) over a predetermined length range of the guide groove 31, a first end portion 37 including the first end 32a of the blowout port 32, and a second end portion 38 including the second end 32b of the blowout port 32.

The first end portion 37 extends along the guide groove 31 while the width of the first end portion 37 is narrowed towards the first end 31a of the guide groove 31 from one end of the intermediate portion 36. The second end portion 38 extends along the guide groove 31 while the width of the second end portion 38 is narrowed towards the second end 31b of the guide groove 31 from the other end of the intermediate portion 36.

The first end 32a of the blowout port 32 reaches the first end 31a of the guide groove 31, and the second end 32b reaches the second end 31b.

The width of the first end portion 37 and the second end portion 38 (for example, an average width or the minimum width) is narrowed, and thus the width of the blowout port 32 is narrowed in the inlet wire portion 33 and the outlet wire portion 34 which are both end portions of the guide groove 31.

For this reason, in the inlet wire portion 33 and the outlet wire portion 34, the blowing out flow rate of the fluid from the blowout port 32 is faster than the lowest flow rate of the fluid in the other portion (an intermediate portion 36).

The blowing out flow rate of the fluid in the inlet wire portion 33 and the outlet wire portion 34 may be faster than an average flow rate (or the highest flow rate) of the fluid in the intermediate portion 36.

Figure 6:
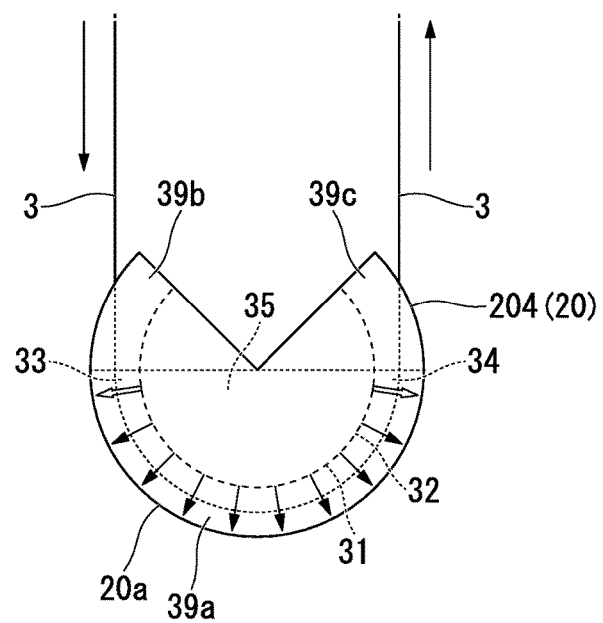
FIG. 6 is a front view showing a modification example of the direction changer of the second example shown in FIGS. 5A and 5B.

A direction changer 204 shown in FIG. 6 is a modification example of the direction changer 203, and is in the shape of a three-quarter circle in a plan view.

The direction changer 204 has a structure in which on an incoming line side and an outgoing line side of a main body portion 39a having the same structure as that of the direction changer 203 shown in FIG. 5A, auxiliary portions 39b and 39c respectively having the same sectional structure as that of the main body portion 39a which are in the shape of an eighth circle in a plan view are continuously disposed.

The direction changer 204 has a basic function identical to that of the direction changer 203 since the bare optical fiber 3 moves into the guide groove 31 of the main body portion 39*a* from the inlet wire portion 33, and moves out through the outlet wire portion 34 after the direction thereof is changed by 180° in the main body portion 39*a*.

In the direction changers 201 to 204 shown in FIGS. 3A to 6, it is preferable that the blowing out flow rate (the highest value) in the inlet wire portions 23 and 33 and the outlet wire portions 24 and 34 is 1.2 to 5 times the lowest value of the blowing out flow rate in the other portion (the intermediate portions 26 and 36).

When the multiplier is less than 1.2 times, an effect of correcting a position shift in the path line becomes insufficient. In contrast, when the multiplier is greater than 5 times, a pressure balance between the inlet wire portions 23 and 33 and the outlet wire portions 24 and 34, and the intermediate portions 26 and 36 is degraded. Thus, the floated bare optical fiber easily vibrates (a blur occurs), and the bare optical fiber 3 is easily in contact with the inside surface 21*c* of the guide groove 21.

By setting the multiplier to be in the range described above, position correction of the path line becomes sufficient, the blur in the bare optical fiber 3 rarely occurs, and thus stable fiber drawing can be realized.

In measurement of the flow rate of the fluid, a wind gauge can be used. In addition, when the measurement of the flow rate of the fluid is performed at the time of performing the fiber drawing with respect to the optical fiber, the optical fiber hinders accurate measurement. Therefore, it is preferable that the measurement is performed in a state in which the optical fiber is not included.

In the measurement of the flow rate of the fluid, a sensor unit of the wind gauge is disposed in the guide groove 21. A measured angle depends on the size of the sensor unit, but when the fluid is gas, high resolution is not necessary, and it is sufficient when the measurement is performed at a resolution of approximately 5° to 10°.

The disposing position of the sensor unit in the guide groove 21 may not be an actual flotation position of the bare optical fiber 3. A relative value may be known, and thus the sensor unit may be disposed in a position in which the measurement can be performed according to the size.

The direction changers 203 and 204 are able to change the direction of the bare optical fiber 3 by 180°, and thus are able to be used as a second direction changer 20C (described later) shown in FIG. 13.

FIG. 7 is a diagram showing a ventilation volume (a wind speed) distribution in the circumferential direction of the direction changer 201 (refer to FIGS. 3A and 3B) which changes the direction of the bare optical fiber 3 by 90°. FIG. 8 is a diagram showing a ventilation volume (a wind speed) distribution in the circumferential direction of the direction changer 203 (refer to FIGS. 5A and 5B) which changes the direction of the bare optical fiber 3 by 180°. In the measurement, SAV-26A manufactured by Kansai Tech Co., Ltd. is used, but the wind gauge is not particularly limited. The amount of the fluid (air) introduced to the direction changer 201 is suitably adjusted such that the amount does not exceed a measurement upper limit of the wind gauge.

As shown in FIG. 7, in the direction changer 201 (refer to FIGS. 3A and 3B) which changes the direction of the bare optical fiber 3 by 90°, the measurement is performed at a plurality of positions in the circumferential direction every 5°. In this example, a position of 0° is an incoming line position, and a position of 90° is an outgoing line position.

As shown in this drawing, the wind speed is maximized in a position close to the incoming line position and the outgoing line position (a position of 10° and 80°), and the wind speed is minimized in a position separated from the incoming line position and the outgoing line position (a position of 35° and 55°).

The wind speed in a position of 10° is the highest value of the blowing out flow rate of the fluid in the inlet wire portion 23 of the direction changer 201 (refer to FIGS. 3A and 3B). The wind speed in a position of 80° is the highest value of the blowing out flow rate of the fluid in the outlet wire portion 24 of the direction changer 201.

The wind speed in a position of 35° and 55° is the lowest value of the blowing out flow rate of the fluid in the intermediate portion 26 of the direction changer 201.

The blowing out flow rate (the highest value) in the inlet wire portion 23 and the outlet wire portion 24 is approximately 1.8 times the lowest value of the blowing out flow rate in the intermediate portion 26.

As shown in FIG. 8, in the direction changer 203 (refer to FIGS. 5A and 5B) which changes the direction of the bare optical fiber 3 by 180°, the measurement is performed at a plurality of positions in the circumferential direction for each 10°. In this example, a position of 0° is the incoming line position, and a position of 180° is the outgoing line position.

As shown in this drawing, the wind speed is maximized in a position close to the incoming line position and the outgoing line position (a position of 20° and 160°), and the wind speed is minimized in a position separated from the incoming line position and the outgoing line position (a position of 70°).

The wind speed in a position of 20° is the highest value of the blowing out flow rate of the fluid in the inlet wire portion 33 of the direction changer 203 (refer to FIGS. 5A and 5B). The wind speed in a position of 160° is the highest value of the blowing out flow rate of the fluid in the outlet wire portion 34 of the direction changer 203.

The wind speed in a position of 70° is the lowest value of the blowing out flow rate of the fluid in the intermediate portion 36 of the direction changer 203.

The blowing out flow rate (the highest value) in the inlet wire portion 33 and the outlet wire portion 34 is approximately 1.8 times the lowest value of the blowing out flow rate in the intermediate portion 36.

In the direction changer shown in FIGS. 3A to 6, an example is described in which the width of the blowout ports 22 and 32 is adjusted, and thus the blowing out flow rate of the fluid in the inlet wire portions 23 and 33 and the outlet wire portions 24 and 34 is set to be faster than the lowest blowing out flow rate of the fluid in the other portion in the circumferential direction (the intermediate portions 26 and 36), and a method of adjusting the blowing out flow rate in the inlet wire portion and the outlet wire portion is not limited thereto.

Next, a first embodiment of a manufacturing method of an optical fiber of the present invention will be described by using a case where the manufacturing apparatus 1A is used as an example.

(Drawing Step)

In the drawing unit 10, the optical fiber preform 2 is heated and drawn, and thus the bare optical fiber 3 is formed.

(Direction Change of Direction Changer)

The bare optical fiber 3 which is drawn out to the vertically downward direction (the first path L1) from the optical fiber preform 2 is directed towards a horizontal direction (the second path L2) due to direction change of 90° of the first direction changer 20A.

The bare optical fiber 3 is directed towards the vertically downward direction (the third path L3) due to direction change of 90° of the second direction changer 20B.

In the direction changers 20A and 20B, the fluid (for example, air) in the fluid storing portion 25 is discharged into the guide groove 21 through the blowout port 22, and thus it is possible to float the bare optical fiber 3. Specifically, a pressure difference between the deep portion 21d and the shallow portion 21e of the guide groove 21 increases due to the discharged air, and thus the bare optical fiber 3 is floated by applying a force of the outer portion in the radial direction to the bare optical fiber 3.

(Coating Step)

In the coating unit 30, the coating material such as a urethane acrylate-based resin is applied (coated) onto the outer circumference of the bare optical fiber 3 and becomes the coating layer, and thus the optical fiber intermediary body 4 is obtained.

(Curing Step)

In the curing unit 40, the coating layer of the optical fiber intermediary body 4 is cured by irradiation of a UV lamp 40a, and the optical fiber 5 is formed.

The optical fiber 5 is wound by the winding means 70 through the pulley 50 and the take-up unit 60.

Figure 9:
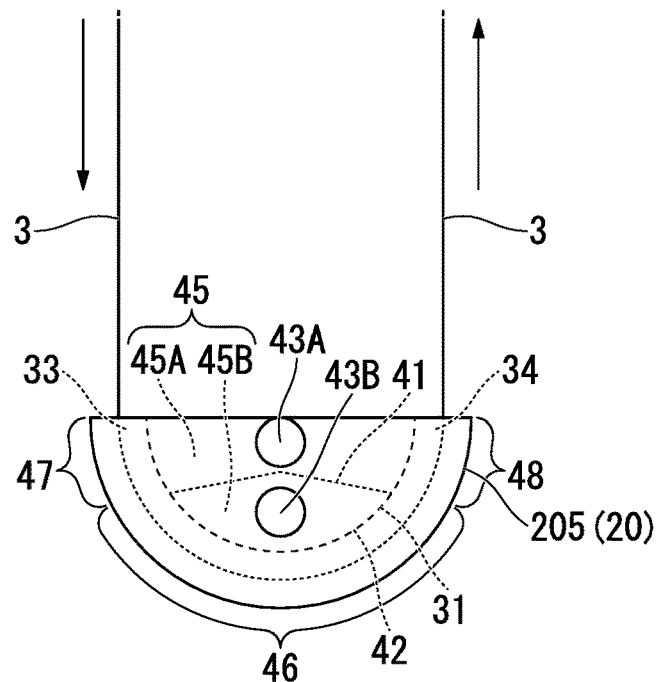
FIG. 9 is a front view showing a third example of the direction changer.

A direction changer 205 shown in FIG. 9 is a third example of the direction changer 20, and is able to change the direction of the bare optical fiber 3 by 180°. The direction changer 205 is in the shape of a semicircle in a plan view, and is configured to discharge the fluid in the guide groove 31 from a fluid storing portion 45 through a blowout port 42.

The shape of the blowout port 42 is not particularly limited, and for example, the width may be constant over the length direction of the guide groove 31.

The fluid storing portion 45 is partitioned into a first fluid storing portion 45A (a first space) and a second fluid storing portion 45B (a second space) by the partition wall 41.

The first fluid storing portion 45A is in communication with a first end portion 47 and a second end portion 48 of the blowout port 42, and the second fluid storing portion 45B is in communication with an intermediate portion 46 of the blowout port 42.

A first supply port 43A which supplies the fluid to the first fluid storing portion 45A and a second supply port 43B which supplies the fluid to the second fluid storing portion 45B are formed on a side surface of the direction changer 205.

In the direction changer 205, a flow volume of the fluid supplied to the fluid storing portions 45A and 45B through the supply ports 43A and 43B is adjusted, and thus it is possible to set inner pressures of the fluid storing portions 45A and 45B to be independent from each other. For this reason, it is possible to set the blowing out flow rate of the fluid in the first end portion 47 and the second end portion 48 and the blowing out flow rate of the fluid in the intermediate portion 46 to be independent from each other.

For this reason, it is possible to set the blowing out flow rate of the fluid in the inlet wire portion 33 and the outlet wire portion 34 to be faster than the lowest blowing out flow rate of the fluid in the other portion in circumferential direction (the intermediate portion 46).

Figure 10:
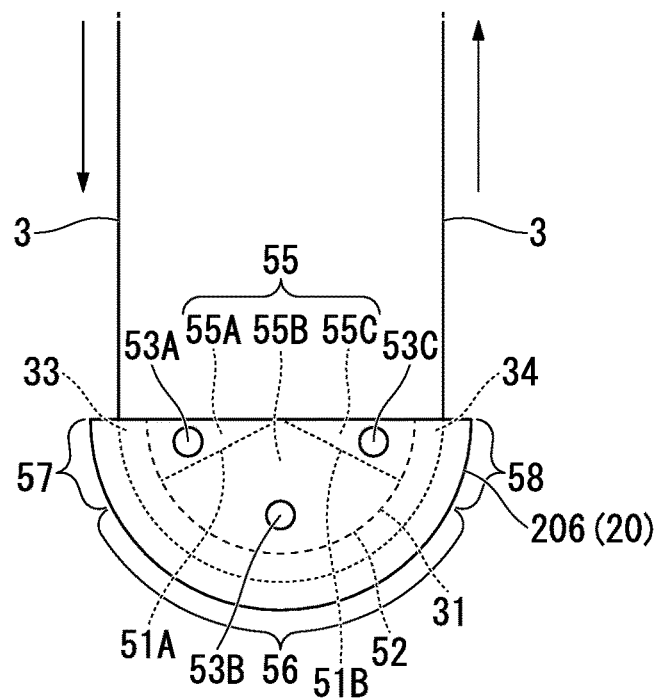
FIG. 10 is a front view showing a fourth example of the direction changer.

A direction changer 206 shown in FIG. 10 is a fourth example of the direction changer 20, and is able to change the direction of the bare optical fiber 3 by 180°. The direction changer 206 is in the shape of a semicircle in a plan view and is configured to discharge the fluid in the guide groove 31 from a fluid storing portion 55 through a blowout port 52.

The fluid storing portion 55 is partitioned into first to third fluid storing portions 55A to 55C by partition walls 51A and 51B.

The first fluid storing portion 55A (a first space) is in communication with a first end portion 57 of the blowout port 52, the second fluid storing portion 55B (a second space) is in communication with an intermediate portion 56 of the blowout port 52, and the third fluid storing portion 55C (a third space) is in communication with a second end portion 58 of the blowout port 52.

A first supply port 53A which supplies the fluid to the first fluid storing portion 55A, a second supply port 53B which supplies the fluid to the second fluid storing portion 55B, and a third supply port 53C which supplies the fluid to the third fluid storing portion 55C are formed on a side surface of the direction changer 206.

In the direction changer 206, the flow volume of the fluid supplied to the fluid storing portions 55A to 55C through the supply ports 53A to 53C is adjusted, and thus it is possible to set the blowing out flow rate of the fluid in the first end portion 57 and the second end portion 58 and the blowing out flow rate of the fluid in the intermediate portion 56 to be independent from each other.

For this reason, it is possible to set the blowing out flow rate of the fluid in the inlet wire portion 33 and the outlet wire portion 34 to be faster than the lowest blowing out flow rate of the fluid in the other portion in the circumferential direction (the intermediate portion 56).

Figure 11:
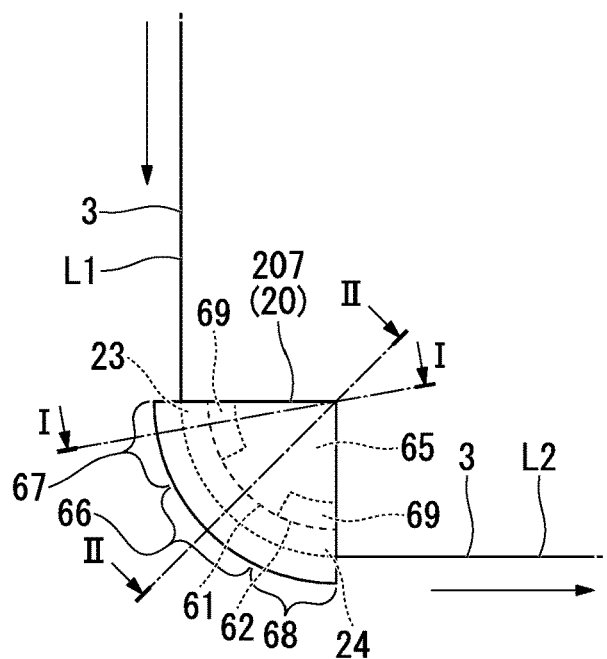
FIG. 11 is a front view showing a fifth example of the direction changer.

A direction changer 207 shown in FIG. 11 is a fifth example of the direction changer 20 and is able to change the direction of the bare optical fiber 3 by 90°.

The direction changer 207 is in the shape of one quarter circle in a plan view and is configured to discharge the fluid in a guide groove 61 from a fluid storing portion 65 through a blowout port 62.

Figure 12A:
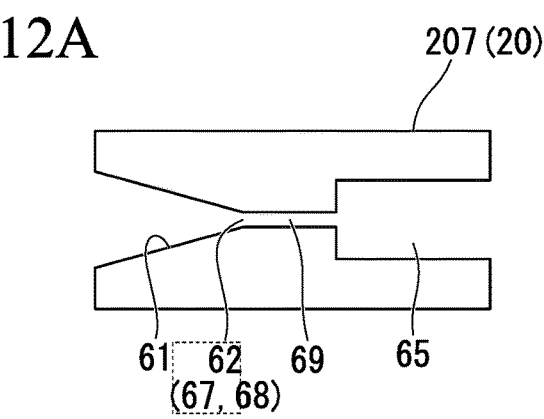
FIG. 12A is a schematic view showing a sectional structure of the direction changer taken along line I-I shown in FIG. 11.

As shown in FIG. 12A, narrow portions 69 and 69 in which the width of a flow path is narrowed by the fluid storing portion 65 are formed between the fluid storing portion 65 and the guide groove 61 in a circumferential direction range in which communication occurs with a first end portion 67 and a second end portion 68 of the blowout port 62.

Figure 12B:
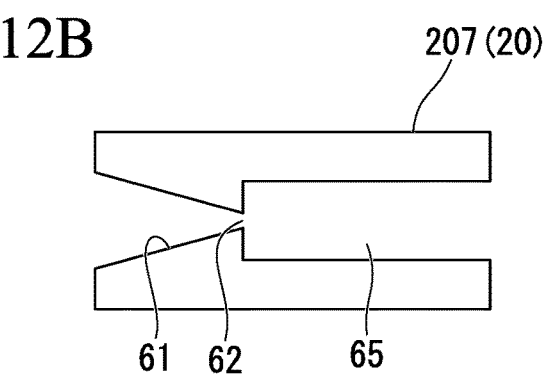
FIG. 12B is a schematic view showing a sectional structure of the direction changer taken along line II-II shown in FIG. 11.

As shown in FIG. 12B, the narrow portion 69 is not formed in a circumferential direction range in which communication occurs with an intermediate portion 66 of the blowout port 62.

For this reason, in the circumferential direction range corresponding to the first end portion 67 and the second end portion 68, a pressure loss at the time of blowing out the fluid increases compared to the circumferential direction range corresponding to the intermediate portion 66.

In the direction changer 207, the narrow portions 69 and 69 are formed in the range corresponding to the first end portion 67 and the second end portion 68, and thus in the inlet wire portion 23 and the outlet wire portion 24, the blowing out flow rate of the fluid from the blowout port 62 is faster than the lowest flow rate of the fluid in the other portion (the intermediate portion 66).

Figure 13:
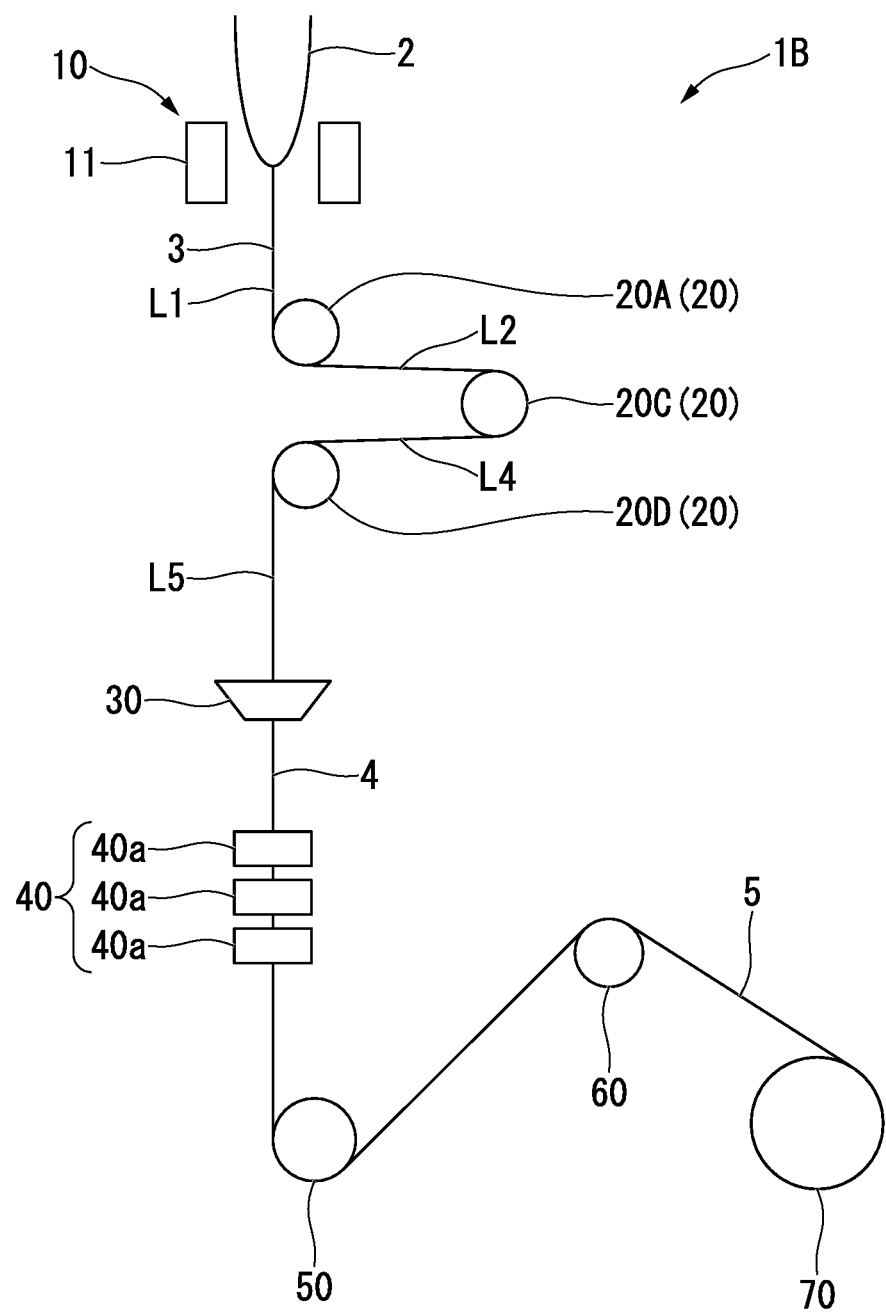
FIG. 13 is a schematic view showing a schematic configuration of a second embodiment of an apparatus of manufacturing an optical fiber.

FIG. 13 is a schematic view showing a schematic configuration of a manufacturing apparatus 1B which is a second embodiment of the manufacturing apparatus of an optical fiber according to the present invention.

The manufacturing apparatus 1B is different from the manufacturing apparatus 1A shown in FIG. 1 in that the manufacturing apparatus 1B includes three direction changers 20 (20A, 20C, and 20D). Hereinafter, the second embodiment of the manufacturing method of an optical fiber of the present invention will be described.

In the manufacturing apparatus 1B, the bare optical fiber 3 which is drawn out from the optical fiber preform 2 to the vertically downward direction (the first path L1) is directed towards the horizontal direction (the second path L2) due to direction change of 90° of the first direction changer 20A.

The bare optical fiber 3 is directed towards a direction opposite to the second path L2 (a third path L4) due to direction change of 180° of the second direction changer 20C and is directed towards the vertically downward direction (a fourth path L5) due to direction change of 90° of a third direction changer 20D.

The bare optical fiber 3 is subjected to the resin coating in the coating unit 30 and the coating layer is cured by the curing unit 40, and thus the optical fiber 5 is obtained.

The optical fiber 5 is wound by the winding means 70 through the pulley 50 and the take-up unit 60.

EXAMPLE

Example 1

The manufacturing apparatus 1A shown in FIG. 1 was prepared.

As the direction changers 20A and 20B, the direction changer 201 shown in FIGS. 3A and 3B was used. The width of the intermediate portion 26 in the blowout port 22 is 50 μm, and the minimum width of the first end portion 27 and the second end portion 28 is 45 μm.

As shown in FIG. 2, an inclination angle θ1 of the inside surface 21c of the guide groove 21 with respect to the radial direction D1 was 0.5°.

A flotation turning radius of the bare optical fiber 3 was approximately 62.5 mm.

The fluid introduced to the direction changers 20A and 20B was air, and the temperature thereof was room temperature (approximately 24° C.).

An introduced flow volume of the air was 100 liters/minute with respect to each of the direction changers 20A and 20B.

The first direction changer 20A was disposed in a position in which the temperature of the bare optical fiber 3 was approximately 1000° C.

When the direction changers 20A and 20B were disposed, a thread having an outer diameter of 0.5 mm was used instead of the bare optical fiber 3, and was centered by visual contact (position adjustment of the path line).

The optical fiber preform 2 was drawn by the drawing unit 10, and thus the bare optical fiber 3 (an outer diameter of 125 μm) was obtained. As a drawing speed and drawing tension, general conditions (a drawing speed of 30 m/second, and drawing tension of approximately 150 gf) were adopted.

The bare optical fiber 3 which was drawn out from the optical fiber preform 2 to the vertically downward direction (the first path L1) was subjected to direction change to the horizontal direction (the second path L2) by the first direction changer 20A, and then was subjected to the direction change to the vertically downward direction (the third path L3) by the second direction changer 20B. The length of the second path L2 was approximately 1 m.

In the coating unit 30, the bare optical fiber 3 was coated with an ultraviolet curing resin and irradiated with ultraviolet rays by the UV lamp 40a in the curing unit 40, the coating layer was cured, and thus the optical fiber 5 was obtained.

The optical fiber 5 was wound by the winding means 70 through the pulley 50 and the take-up unit 60.

In the manufacturing method, it was confirmed that the bare optical fiber 3 was not damaged by the direction changers 20A and 20B, and the optical fiber 5 was able to be manufactured with a sufficient yield.

Example 2

The optical fiber 5 was manufactured by using the manufacturing apparatus 1B shown in FIG. 13 as follows.

As the first direction changer and the third direction changer 20A and 20D, the direction changer 201 having the same specification as that used in Example 1 was used.

As the second direction changer 20C, the direction changer 205 shown in FIG. 9 was used. The first end portion 47 is a portion including the one end of the guide groove 31, and is a portion of the circumferential direction range corresponding to 30°. The second end portion 48 is a portion including the other end of the guide groove 31, and is a portion of the circumferential direction range corresponding to 30°.

The flow volume of the air introduced to the first fluid storing portion 45A from the first supply port 43A was set to be 2.5 times the flow volume of the air introduced to the second fluid storing portion 45B from the second supply port 43B.

As a result of manufacturing the optical fiber 5 by using the manufacturing apparatus 1B, it was confirmed that the bare optical fiber 3 was not damaged by the direction changers 20A, 20C, and 20D, and the optical fiber 5 was able to be manufactured with a sufficient yield.

Example 3

In the manufacturing apparatus 1A shown in FIG. 1, the optical fiber 5 was manufactured by the same method as that in Example 1 except that the direction changer 207 shown in FIGS. 11 to 12B was used in the direction changers 20A and 20B instead of the direction changer 201.

In the direction changer 207, the blowing out flow rate (the highest value) in the inlet wire portion 23 and the outlet wire portion 24 (the first end portion 67 and the second end portion 68) was 1.2 times the lowest value of the blowing out flow rate in the other portion (the intermediate portion 66).

As a result of manufacturing the optical fiber 5 by this manufacturing method, it was confirmed that the bare optical fiber 3 was not damaged by the direction changers 20A, 20C, and 20D, and the optical fiber 5 was able to be manufactured with a sufficient yield.

Comparative Example 1

In the manufacturing apparatus 1A shown in FIG. 1, the optical fiber 5 was manufactured by the same method as that in Example 1 except that the same direction changer as the direction changer 201 shown in FIGS. 3A and 3B was used as the direction changers 20A and 20B and the width of the blowout port was constant (a width of 50 μm) in the length direction.

In the direction changer, the blowing out flow rate of the fluid in the inlet wire portion and the outlet wire portion was the same as the blowing out flow rate of the fluid in the other portion.

As a result of performing a proof test by manufacturing the optical fiber 5 using this manufacturing apparatus, breaking which was considered to be caused by bringing the bare optical fiber 3 in contact with the inside surface of the guide groove occurred. Thus, the manufacturing yield was not sufficient.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An apparatus for manufacturing an optical fiber, comprising:
    a drawing portion configured to draw an optical fiber perform and form a bare optical fiber;
    a coating portion configured to dispose a coating layer formed of a resin on an outer circumference of the bare optical fiber; and
    a curing portion configured to cure the coating layer,
    wherein a direction changer which changes a direction of the bare optical fiber is disposed in any position from the drawing portion to the coating portion,
    the direction changer includes a guide groove which guides the bare optical fiber,
    a blowout port of a fluid which floats the bare optical fiber wired along the guide groove is formed along the guide groove in the guide groove, and
    the blowout port is configured such that an average flow rate or a highest flow rate of the fluid in an inlet wire portion of the bare optical fiber entering the guide groove and an average flow rate or a highest flow rate of the fluid in an outlet wire portion of the bare optical fiber outputting from the guide groove is faster than a lowest flow rate of the fluid in an intermediate portion between the inlet wire portion and the outlet wire portion.

2. The apparatus for manufacturing an optical fiber according to claim 1,
    wherein a width of the blowout port of the inlet wire portion and the outlet wire portion is smaller than a width of the blowout port of the intermediate portion, and the average flow rate or the highest flow rate of the fluid in the inlet wire portion and the outlet wire portion is faster than the lowest flow rate of the fluid in the intermediate portion.

3. The apparatus for manufacturing an optical fiber according to claim 1,
    wherein an inner space portion which transports the fluid to the blowout port is ensured in the direction changer, and
    the inner space portion includes a first space portion which is in communication with the blowout port of the inlet wire portion and the outlet wire portion, and a second space portion which is in communication with the blowout port of the intermediate portion.

4. The apparatus for manufacturing an optical fiber according to claim 2,
    wherein an inner space portion which transports the fluid to the blowout port is ensured in the direction changer, and
    the inner space portion includes a first space portion which is in communication with the blowout port of the inlet wire portion and the outlet wire portion, and a second space portion which is in communication with the blowout port of the intermediate portion.

5. The apparatus for manufacturing an optical fiber according to claim 1,
    wherein an inner space portion which transports the fluid to the blowout port is ensured in the direction changer, and
    the inner space portion includes a first space portion which is in communication with the blowout port of the inlet wire portion, a second space portion which is in communication with the blowout port of the intermediate portion, and a third space portion which is in communication with the blowout port of the outlet wire portion.

6. The apparatus for manufacturing an optical fiber according to claim 2,
    wherein an inner space portion which transports the fluid to the blowout port is ensured in the direction changer, and
    the inner space portion includes a first space portion which is in communication with the blowout port of the inlet wire portion, a second space portion which is in communication with the blowout port of the intermediate portion, and a third space portion which is in communication with the blowout port of the outlet wire portion.

7. The apparatus for manufacturing an optical fiber according to claim 1,
    wherein a pressure loss at the time of blowing out the fluid from the blowout port in the inlet wire portion and the outlet wire portion increases compared to the pressure loss in the intermediate portion by forming a narrow portion in communication with the blowout port of the inlet wire portion and the outlet wire portion in the direction changer, and thus the average flow rate or the highest flow rate of the fluid in the inlet wire portion and the outlet wire portion is faster than the lowest flow rate of the fluid in the intermediate portion.

8. The apparatus for manufacturing an optical fiber according to claim 2,
    wherein a pressure loss at the time of blowing out the fluid from the blowout port in the inlet wire portion and the outlet wire portion increases compared to the pressure loss in the intermediate portion by forming a narrow portion in communication with the blowout port of the inlet wire portion and the outlet wire portion in the direction changer, and thus the average flow rate or the highest flow rate of the fluid in the inlet wire portion and the outlet wire portion is faster than the lowest flow rate of the fluid in the intermediate portion.

* * * * *